M. ROSENBERG.
BAIT HOLDER FOR TROLLING OUTFITS.
APPLICATION FILED OCT. 30, 1913.

1,095,288.

Patented May 5, 1914.

Witnesses
E. C. Skinkle
A. H. Opsahl

Inventor
Martin Rosenberg
By Williamson & Merchant
His Attorneys

UNITED STATES PATENT OFFICE.

MARTIN ROSENBERG, OF AKELY, MINNESOTA, ASSIGNOR OF ONE-HALF TO HARTWIG G. ROSENBERG, OF MINNEAPOLIS, MINNESOTA.

BAIT-HOLDER FOR TROLLING OUTFITS.

1,095,288.

Specification of Letters Patent.

Patented May 5, 1914.

Application filed October 30, 1913. Serial No. 798,202.

*To all whom it may concern:*

Be it known that I, MARTIN ROSENBERG, a citizen of the United States, residing at Akely, in the county of Hubbard and State of Minnesota, have invented certain new and useful Improvements in Bait-Holders for Trolling Outfits; and I do hereby declare the following to be a full, clear, and exact description of the invention, such as will enable others skilled in the art to which it appertains to make and use the same.

My invention relates to fishing tackle and has for its object to provide an improved bait holder for trolling outfits.

To this end, the invention consists of the novel devices and combinations of devices hereinafter described and defined in the claims.

In the accompanying drawings, which illustrate the invention, like characters indicate like parts throughout the several views.

Figure 1:
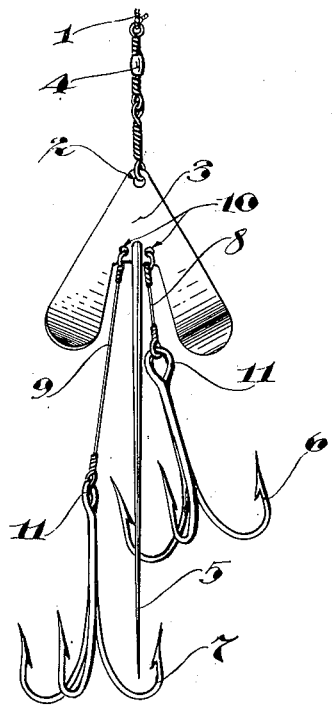

Referring to the drawings: Figure 1 is a view of a trolling outfit having my invention incorporated therein; and Fig. 2 is a view corresponding to Fig. 1, with the exception that bait, in the form of a minnow, is applied to the bait holder.

The numeral 1 indicates a fish line secured to an eye 2 in the forward end of a spinner or twirler 3 by a swivel connection 4. Rigidly secured to the body of the spinner 3 is a sharp bait holding needle 5 which projects rearwardly between the wings or blades of said spinner. This bait holding needle 5 is axially located with respect to the spinner 3, intermediately between the blades thereof.

Two clusters or gangs of fish hooks 6 and 7 are flexibly connected to the body of the spinner 3, on each side of the bait holding needle 5, by relatively short and long, comparatively stiff wires 8 and 9. The flexibility between the hooks 6 and 7 and the spinner 3 is secured at the junction of the connections 8 and 9 therewith. The forward ends of the connections 8 and 9 are passed through perforations 10 in the body of the spinner 3, located one on each side of the bait holding needle 5, and are then twisted upon themselves. The rear ends of said connections are passed through eyes 11 formed at the junction of the shanks of the hooks 6 and 7 and are then twisted upon themselves. It is, of course, understood that various other connections may be provided for securing the hooks 6 and 7 to the spinner 3.

Figure 2:
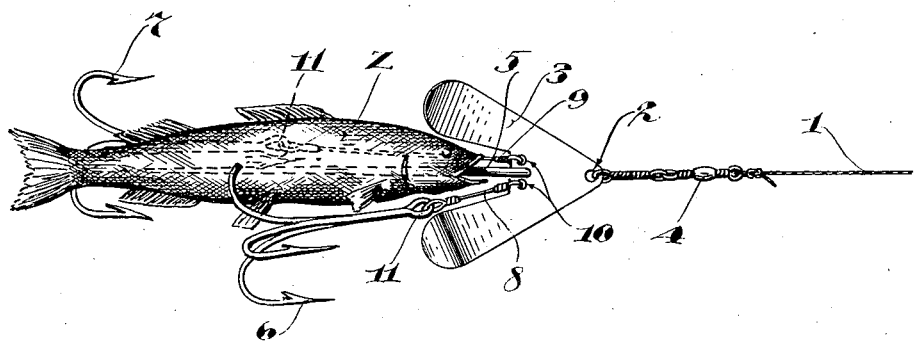

The bait Z, which is in the form of a minnow, is applied to the bait holding needle 5 in a manner as shown in Fig. 2. One hook of each cluster is secured in the bait, thereby holding the same in position on the bait holding needle 5 and, at the same time, holding the clusters of hooks in position. A frog or other suitable bait may be used instead of a minnow.

The above described device, while extremely simple and of comparatively small cost to manufacture, has, in actual usage, been found highly efficient for the purpose had in view.

What I claim is:

1. In a trolling outfit, the combination with a spinner having a swivel joint connecting the same to a fish line, of a smooth, straight bait holding needle rigidly secured to said spinner and extending rearward between the blades thereof, a cluster of fish hooks arranged for engagement with the bait for holding the same on said needle, and a flexible connection between said spinner and fish hooks.

2. In a trolling outfit, the combination with a spinner having a swivel joint connecting the same to a fish line, of a smooth, straight, sharp bait holding needle rigidly secured to said spinner and extending rearward between the blades thereof, two clusters of fish hooks arranged for engagement with the bait for holding the same on said needle, and relatively short and long flexible connections between said spinner and the two clusters of fish hooks.

3. In a trolling outfit, the combination with a spinner having a swivel joint connecting the same to a fish line, of a smooth, straight, sharp bait holding needle rigidly secured to said spinner and extending rearward between the blades thereof, two clusters of fish hooks arranged for engagement with the bait for holding the same on said needle, and relatively short and long flexible connections between said spinner and the two clusters of fish hooks, said connections being located on opposite sides of said bait holding needle.

In testimony whereof I affix my signature in presence of two witnesses.

MARTIN ROSENBERG.

Witnesses:
M. J. WOOLLEY,
A. J. McCOUVILLE.